United States Patent [19]
Pillette

[11] Patent Number: 4,458,521
[45] Date of Patent: Jul. 10, 1984

[54] LEAK DETECTION SYSTEM

[76] Inventor: Kibbie P. Pillette, Abbeville, La. 70510

[21] Appl. No.: 364,762

[22] Filed: Apr. 2, 1982

Related U.S. Application Data

[63] Continuation-in-part of Ser. No. 292,121, Jul. 20, 1981, which is a continuation-in-part of Ser. No. 954,578, Oct. 23, 1978, Pat. No. 4,232,736, which is a continuation-in-part of Ser. No. 786,576, Apr. 11, 1977, abandoned.

[51] Int. Cl.³ .............................................. G01M 3/28
[52] U.S. Cl. ..................................... 73/46; 73/40.5 R
[58] Field of Search ................ 73/46, 40.5 R; 166/53; 277/2; 285/93

[56] References Cited

U.S. PATENT DOCUMENTS 2,571,236 10/1951 Hamilton, Jr. ............................ 73/46
2,766,614 10/1956 Cook ....................................... 73/46

FOREIGN PATENT DOCUMENTS 999965 10/1951 France .................................... 73/46
504638 4/1939 United Kingdom ..................... 73/46
625592 6/1949 United Kingdom ..................... 73/46

Primary Examiner—S. Clement Swisher
Assistant Examiner—Joseph W. Roskos
Attorney, Agent, or Firm—Charles C. Garvey, Jr.

[57] ABSTRACT

An apparatus and method for detecting leaks in blowout preventors provides a capsule which forms an envelope about a portion of the blowout preventor where leaks exterior to the blowout preventor might occur. The capsule preferably is formed by a plurality of curved capsule segments which abut and radially assemble about flanges of the BOP system. The capsule segments carrying mating flanges which bolt together upon assembly to secure the capsule segments about the BOP stack. The interior of the flanges provides an inner space which collects leaks which might occur. The interior space is pneumatically connected to a relay which is attached to the capsule means for responding to the occurrence of the accumulated leak within the capsule.

14 Claims, 5 Drawing Figures

LEAK DETECTION SYSTEM

REFERENCE TO RELATED APPLICATION

This is a continuation-in-part of U.S. Pat. Ser. No. 292,121 filed July 20, 1981 entitled "Leak Detection System" which is a continuation-in-part of U.S. Pat. Ser. No. 954,578, filed Oct. 23, 1978, now U.S. Pat. Ser. No. 4,232,736, which is a continuation-in-part of U.S. Pat. Ser. No. 786,576, filed Apr. 11, 1977, now abandoned.

BACKGROUND OF THE INVENTION

1. Field of the Invention

The present invention relates to oil and gas well drilling and blow out preventor systems associated generally with oil and gas well drilling, and more particularly, the present invention relates to the detection of leaks from a blow out preventor at the wellhead. Even more particularly, the present invention relates to an apparatus for the detection of leaks from fittings at the blow out preventor and the subsequent collection and usage of the leak pneumatically to trigger an instrumentation system for valve closure, alarm actuation or the like.

2. General Background

In the drilling of oil and gas wells or in the subsequent production of oil and gas after drilling, a well is normally equipped at the wellhead (i.e., the top of the well) with a device which prevents the catastrophic uncontrolled release of oil and gas from the well as occurs when the well comes in too rapidly, or when high pressures within the well are released to the surface in an uncontrolled fashion. This abrupt release of gas from the well is known as a "blow out" condition. Devices are commercially available to close the well off at the wellhead to prevent damage or injury or loss of the well under such conditions. Such devices are known in the oilfield generally as "blow out preventors", or in oil field terminology sometimes this is shortened to the term "B.O.P." or "B.O.P. stack".

A blow out preventor or "B.O.P." or "B.O.P. stack" is typically a device which is fastened to the well at the surface or "wellhead" and which is used in a manual or automatic fashion to close off the well bore in order to trap high pressurized fluids from escaping. A blow out preventor is normally an outside device as opposed to an inside B.O.P. which might be run in the well or casing itself. An outside B.O.P. is typically comprised of an outside housing which provides on its inside one or more "rams" which are, for example, hydraulically driven, typically paired cooperating closures that proceed from an outer lateral position inwardly along a common horizontal plane until they meet at a sealing position at which the rams cooperate with their mating faces forming a closure of the well bore. Thus, there is prevented an uncontrolled escape of fluids from the well bore which can be catastrophic and lead to explosion, fire, injury, death as well as property damage. Rams which are part of the blow out preventor can have indentations to conform to the exterior of the drill pipe, or can be merely flat on their mating surfaces so as to cut the pipe in half upon closure, to seal the well. These latter rams are called shear or blind rams, whereas those with indentations to fit about the drill pipe so as not to damage it are known as pipe rams. There can also be provided in many cases an annular preventor at the uppermost portion of the B.O.P. stack.

The term "stack" is used because different types of ram assemblies are assembled together, one above the other, in such a fashion as to provide a "stack" of the various rams to the overall blow out preventor system. The assembly of the blow out preventor and its attachment to the wellhead necessarily provides a plurality of fittings such as, for example, flanged connections which might be bolted, for example, and which because of their assembly produces sealed interfaces which are subject to leakage upon failure of the seal. It will be appreciated that leakage though these flanged or like connections are unaffected by the rams which comprise the sole means of closure of the wellbore in the event of a blow out condition. Thus, while the various pipe rams, blind rams, and shear rams may form an inside closure within the housing of the B.O.P. stack to the escape of high pressurized fluids from the well bore, it will be appreciated that leakages through the flanged or other connections of the blow out preventor will not be closed and and thus a catastrophic leakage or explosion could occur as gas or the like escapes through these connections where a leak exists. It is to this problem that the present invention is directed.

The present invention solves these problems by providing a means for collecting any leakage through the B.O.P. stack and especially at the connection portions and flanges where seal failure occurs. The collected leak is used as instrumentation fluid to pneumatically or fluidically operate a desired instrumentation system to indicate the presence of a leak, sound an alarm, actuate a valve closure or the like or for that matter perform any other task which could be done once accumulated pressure were available for such instrumentation purposes.

The present invention provides a capsule which forms an envelope about the flanged connection or other point of assembly of the B.O.P. stack which might be "suspect" of leakage. It should be understood that the term "suspect" would generally indicate any portion of a B.O.P. stack which might produce an external leak. This could be a flanged condition, for example, or any other interface of two separate parts on the B.O.P. stack which relied upon a perfect seal in order to keep leakage from occurring.

The capsule would be assembled in a sealable fashion about the suspect area of the B.O.P. stack forming a seal thereabout with the enveloping capsule so positioned collecting any leakage therewithin. The leakage would be transmitted through a provided annular collecting space to a regulator affixed to, for example, the wall of the capsule where the accumulated leakage could be used as instrumentation fluid to pneumatically actuate a regulator to perform any desired instrumentation task such as the closure of a valve, the sounding of an alarm, or the like. The use of such a regulator for the purpose of instrumentation responsive to the accumulation of a leak is discussed generally in my prior U.S. Pat. Ser. No. 4,232,736 which is hereby incorporated by reference, of which the present application is a continuing application.

The present invention thus provides an automatic remotely operable leak detection system for use with blow out preventors.

It is thus an object of the present invention to provide a leak detection and safety monitoring system for use with blow out preventors which senses and operates responsive to leakage from the blow out preventor to the exterior thereof.

It is another object of the present invention to provide a leak detection system for use with blow out preventors wherein the leak from the system itself provides usable instrumentation fluid for operation of the apparatus.

Another object of the present invention is to provide a leak detection system for use with blow out preventors which is simple to construct, easy to maintain, and easy to use.

Another object of the present invention is to provide a leak detection system for use with blow out preventors which is highly versatile, and which can be installed on different types of blow out preventors in a variety of applicatons including existing, in-use devices.

Another object of the present invention is to provide a leak detection system for blow out preventors which provides leak detection at the earliest occurrence of leakage therefrom.

Another object of the present invention is to provide a leak detection system for use with blow out preventors which can be easily adapted to a variety of instrumentation systems.

BRIEF DESCRIPTION OF THE DRAWINGS

For a further understanding of the nature and objects of the present invention, reference should be had to the following detailed description taken in conjunction with the accompanying drawings in which like parts are given like reference numerals and wherein.

DETAILED DESCRIPTION OF THE PREFERRED EMBODIMENT

Figure 4:
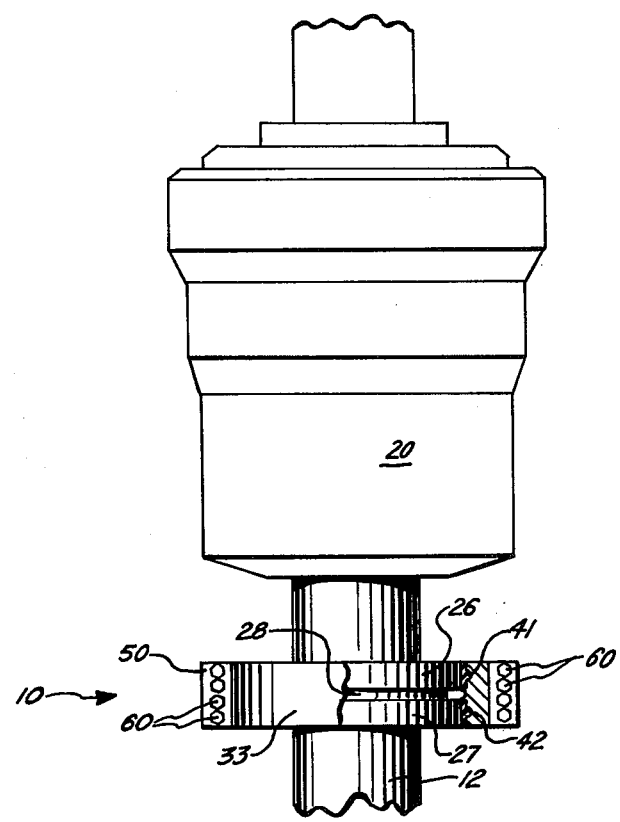
FIG. 4 is a partial front elevational schematic view of the preferred embodiment of the apparatus of the present invention as installed on a typical blow out preventor.
Figure 5:
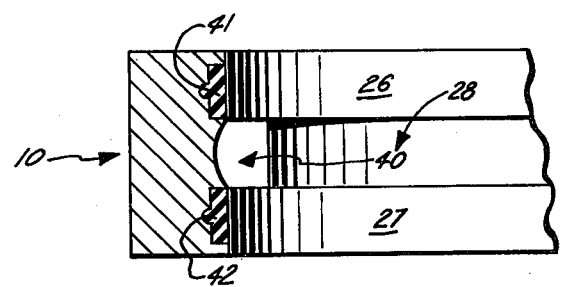
FIG. 5 is a partial sectional view of the preferred embodiment of the apparatus of the present invention.

FIG. 4 shows schematically a blow out preventor (or B.O.P.) installation which is designated generally by the numeral 20. Blowout preventor 20 is typically installed at the uppermost portion of the well and casing 12 which is referred to in the art as the "wellhead".

The uppermost portion of the well or wellhead can typically be a flanged connection where B.O.P. 20 connects, comprising a pair of spaced apart flanges 26 and 27 which form an interface 28 which can be subject to leakage if the interface is not properly sealed. Thus, capsule 10 is shown placed about flanged connection 26, 27 in an envelope fashion forming a seal thereabout as will be described more fully hereinafter. A bolted connection can be used as schematically shown by bolts 60 in FIG. 4 which assemble capsule 10 thereabout by bolting together flanges 50 thereof. It should be understood, however, that capsule 10 can be installed at any location on "B.O.P." 20 "suspect" of leakage.

A pair of upper and lower seals 41, 42 prevent the escape of leakage once it occurs. Typically such seals 41, 42 would abut the outer periphery of each flange 26, 27, for example, to form the desired seal.

Figure 1:
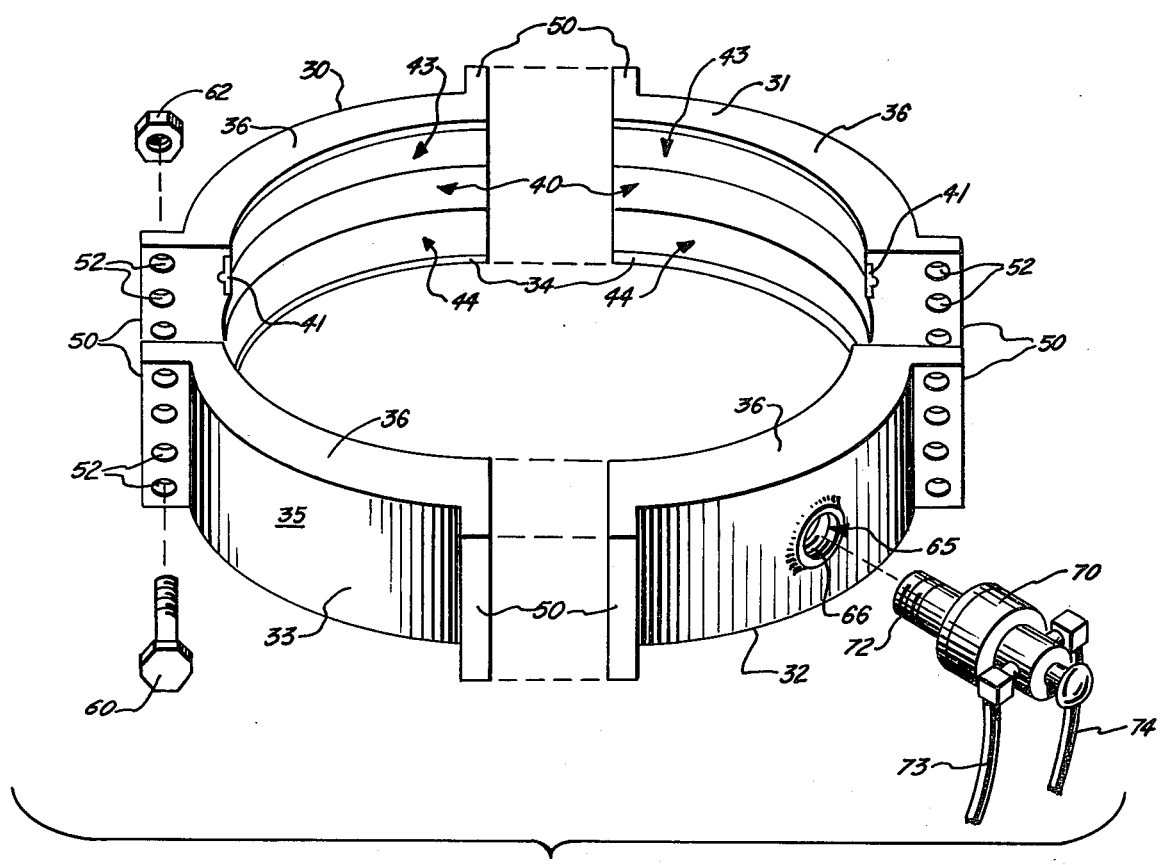
FIG. 1 is a perspective exploded view of the preferred embodiment of the apparatus of the present invention.
Figure 2:
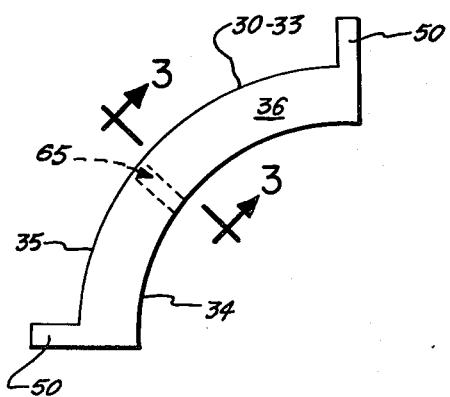
FIG. 2 is a partial top view of the preferred embodiment of the apparatus of the present invention.
Figure 3:
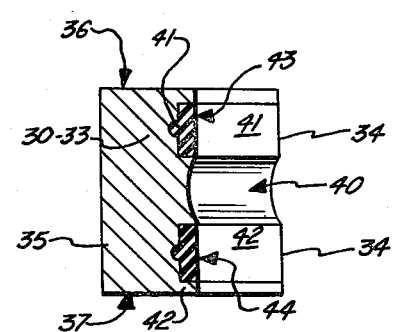
FIG. 3 is a sectional view taken along line 3—3 of FIG. 2.

FIGS. 1 through 3 show more particularly the preferred embodiment of the present invention designated generally by the numeral 10.

In FIG. 1 there can be seen a plurality of capsule sections 30–33. Each section 30–33 provides an outer curved wall 35 and an inner curved wall 34 (which walls 34, 35 are generally concentric) and upper and lower flat surfaces 36–37. Flanges 50 at the edge portions are provided with each capsule section 30–33 and provide a plurality of openings 52 therethrough which align upon assembly of adjacent sections 30–33 so that bolted connections can be made to hold flanges 50 together. In FIG. 1, a bolt 60 and a nut 62 connection can be seen as prior to assembly through openings 52.

Each section 30–33 of capsule 10 provides at its inner wall 34 an annular recess or space 40 which during operation forms a continuous annular space between seals 41, 42 which space collects any leak that occurs at the interface 28 between the flanges. The annular groove or space 40 is a preferably 360° degree continuous groove or space 40 when all four capsule sections 30–33 are assembled by using the bolted connections aforementioned. One of the sections 32, for example, provides a bore 65 which is bored through the entire section 32, communicating with space 40. In FIG. 1, bore 65 can be seen. Bore 65 begins at outer surface 35 of section 32 and proceeds all the way through until it outcrops at inner surface 34 at space 40. From the above, it can be seen that the occurrence of a leak at the interface between flanges 25 and 26 will cause gas or fluid to accumulate within space 40 and be channeled towards bore 65 and pneumatic relay 70. Seals 41, 42 will prevent upward and downward movement of the leak.

Inner threads 66 provided on bore 65 allow pneumatic relay 70 to be threadably attached thereto in a sealable fashion at threads 72 of pneumatic relay 70. Instrumentation lines 73, 74 would then allow the leak accumulated within groove 40 to be used for instrumentation purposes to activate the pneumatic relay 70 to perform any desired instrumentation function such as the closure of a valve, the sounding of an alarm, illuminating a light, or the like.

FIG. 3 shows more particularly in a sectional view, the construction of a particular capsule section 30–33. Note that each seal 41, 42 provides an innermost surface 43, 44 respectively which is substantially flat in section but which is curved to correspond with the curved outer periphery of a flange, for example. Changes in shape, of course, within the teaching of the present invention could be made to adapt the above to any particular portion of the B.O.P. stack which was to be encapsulated or enveloped, and through which leaks might occur.

Capsule 10 could be manufactured of any suitable material such as plastic, for example, while seals 41, 42 would be of a pliable seal-type material such as Viton, Neoprene, or the like.

Flanges 50 would be integrally formed with each section 30–33 and would be oriented in such a way as to mate in a face-to-face relationship with its abutting flange 50 as shown by the dotted lines in FIG. 1. Each section 30–33 would comprise a 90° degree section with all four sections as assembled providing the entire 360° degree seal about the desired flange connection portion of the B.O.P. stack.

Pneumatic relay 70 could be any type of regulator which would be activated responsive to an accumulation of leakage within annular space 40 and thus a rise in pressure. Such regulators are commercially available.

Instrumentation lines 73, 74 would be used to run a continuous stream of instrumentation air through pneumatic relay 70, or alternatively would be closed and would open to allow the circulation of instrumentation air depending upon the type of regulator used in either case, the shift would occur responsive to the accumulation of a leak within space 40.

Because many varying and different embodiments may be made within the scope of the inventive concept herein taught, and because many modifications may be made in the embodiments herein detailed in accorance with the descriptive requirement of the law, it is to be understood that the details herein are to be interpreted as illustrative and not in a limiting sense.

What is claimed as invention is:

1. An apparatus for detecting leaks in blow out preventor systems comprising:
   a. capsule means for forming an envelope about a portion of a blow out preventor where leaks exterior to the blow out preventor might occur, said means providing a space for the accumulation of leaks therein;
   b. means associated with said capsule means for sealably attaching said capsule means to the blow preventor; and
   c. pneumatically actuated relay means pneumatically attached to said capsule means for responding to the occurrence of an accumulated leak within said capsule means.

2. The apparatus of claim 1 wherein said capsule means is comprised of a plurality of separable capsule segments, and means for affixing said segments together upon assembly.

3. The apparatus of claim 1 wherein said capsule means provides a bore communicating with said space and said relay means, with said relay means being affixed to said capsule means by direct attachment thereto.

4. The apparatus of claim 1 wherein said capsule means comprises a plurality of curved capsule segments, each of said segments providing an assembly flange projecting radially therefrom with respect to such curvature with the assembly flanges of each of said segments mating together upon assembly.

5. The apparatus of claim 1 further comprising seal means on said capsule means for isolating said leak accumulation space of said capsule means.

6. The apparatus of claim 1 further comprising conduit means for communicating an instrumentation system with said relay means.

7. The apparatus of claim 1 wherein said capsule means comprises a plurality of capsule sections which are connectable together, each capsule section providing an inner grooved surface, and said plurality of capsule sections comprising upon assembly a capsule body having inner and outer curved surfaces which are generally concentric, and said inner grooved surfaces of capsule align upon assembly to define a continuous annular space for the collection of leaks therewithin.

8. The apparatus of claim 7 wherein said annular groove is positioned generally between a pair of provided annular seals which cooperate to prevent escape of fluid from said space during operation.

9. A method for detecting fluid leaks from an oil/gas well blow out preventor stack positioned at the wellhead, comprising the steps of:
   a. forming an envelope about a portion of the blow out preventor suspect of leakage;
   b. collecting any leaks from the blow out preventor within the envelope; and
   c. using the accumulated leaks as instrumentation fluid to notify that a leak has occurred, by operating therewith a pnuematic relay device.

10. The method of claim 9 wherein in step "a", the envelope is formed by attaching a plurality of capsule sections about the suspect area of the blow out preventor in a sealable fashion but spaced at least in part therefrom creating a sealed closure thereabout.

11. The method of claim 9 wherein in step "a", the envelope comprises a removable portable structure which can be assembled to and disassembled from a position upon the blow out preventor.

12. The method of claim 9 wherein there is further provided the step between steps "a" and "b" of providing a bore hole through the envelope through which collected leakage can be transmitted, and in step "c" the leakage is transmitted through the bore hole to the relay.

13. The method of claim 9 further comprising the step prior to step "a" of providing an envelope capsule which comprises a plurality of sections which can be assembled together about a suspect portion of a blow out preventor, the sections defining upon assembly an annular space within which leaks can be collected, the space being isolated during operation at least in part by a pair of corresponding annular seals positioned on either side of the space to isolate the space therebetween.

14. The method of claim 13 wherein the annular seals abut the blow out preventor.

* * * * *